US010645590B2

(12) United States Patent
Yerramalli et al.

(10) Patent No.: US 10,645,590 B2
(45) Date of Patent: May 5, 2020

(54) SELF-CONTAINED TRANSMISSIONS FOR MACHINE TYPE COMMUNICATIONS

(71) Applicant: QUALCOMM Incorporated, San Diego, CA (US)

(72) Inventors: Srinivas Yerramalli, San Diego, CA (US); Tamer Kadous, San Diego, CA (US); Chirag Sureshbhai Patel, San Diego, CA (US); Chih-Hao Liu, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 15/812,810

(22) Filed: Nov. 14, 2017

(65) Prior Publication Data
US 2018/0139618 A1   May 17, 2018

Related U.S. Application Data

(60) Provisional application No. 62/423,171, filed on Nov. 16, 2016.

(51) Int. Cl.
*H04W 72/08* (2009.01)
*H04W 16/14* (2009.01)
*H04L 5/00* (2006.01)
*H04L 27/26* (2006.01)
*H04W 72/04* (2009.01)
(Continued)

(52) U.S. Cl.
CPC ............. *H04W 16/14* (2013.01); *H04L 5/001* (2013.01); *H04L 5/0055* (2013.01);
(Continued)

(58) Field of Classification Search
CPC ............. H04W 74/0808; H04W 16/14; H04W 74/006; H04W 74/0833; H04W 74/0816;
(Continued)

(56) References Cited

U.S. PATENT DOCUMENTS

2015/0349931 A1    12/2015  Damnjanovic et al.
2016/0233989 A1*    8/2016  Belghoul ............. H04L 1/1887
(Continued)

FOREIGN PATENT DOCUMENTS

WO    WO-2016103533 A1    6/2016

OTHER PUBLICATIONS

International Search Report and Written Opinion—PCT/US2017/061746—ISA/EPO—dated Feb. 15, 2018.
(Continued)

*Primary Examiner* — Sai Aung
(74) *Attorney, Agent, or Firm* — Patterson + Sheridan, L.L.P.

(57) ABSTRACT

Certain aspects of the present disclosure provide techniques for transmitting and receiving self-contained transmissions for enhanced machine type communications (eMTC) in unlicensed spectrum (eMTC-U). An exemplary method includes a BS determining, based on a listen before talk (LBT) procedure, that a first portion of unlicensed radio frequency spectrum is available for a frame, transmitting, on the first portion of the unlicensed radio frequency spectrum, a control channel indicating a frame format of the frame or a grant of the first portion of the unlicensed radio frequency spectrum for the frame, and communicating with a user equipment (UE) according to the frame format or the grant during the frame.

27 Claims, 7 Drawing Sheets

(51) Int. Cl.
*H04W 72/12* (2009.01)
*H04W 72/14* (2009.01)
*H04W 74/08* (2009.01)
*H04J 11/00* (2006.01)
*H04L 27/00* (2006.01)
*H04L 1/16* (2006.01)
*H04L 1/18* (2006.01)
*H04B 1/713* (2011.01)

(52) U.S. Cl.
CPC ........ *H04L 5/0057* (2013.01); *H04L 27/2602* (2013.01); *H04W 72/042* (2013.01); *H04W 72/1215* (2013.01); *H04B 1/713* (2013.01); *H04J 2011/0016* (2013.01); *H04L 1/1671* (2013.01); *H04L 1/1812* (2013.01); *H04L 1/1896* (2013.01); *H04L 5/0048* (2013.01); *H04L 27/0006* (2013.01); *H04W 72/14* (2013.01); *H04W 74/0808* (2013.01)

(58) Field of Classification Search
CPC ............. H04W 24/10; H04W 72/0446; H04W 72/085; H04W 72/1268
See application file for complete search history.

(56) References Cited

U.S. PATENT DOCUMENTS

| 2016/0309498 | A1  | 10/2016 | Luo et al. | |
| 2017/0339717 | A1  | 11/2017 | Futaki | |
| 2018/0115983 | A1* | 4/2018  | Harada | H04J 11/00 |
| 2018/0255578 | A1* | 9/2018  | Kim | H04L 5/001 |
| 2018/0279372 | A1* | 9/2018  | Takeda | H04J 11/00 |
| 2019/0014596 | A1* | 1/2019  | Yang | H04W 72/0446 |

OTHER PUBLICATIONS

NTT Docomo: "Views on Issues Related to LAA UL", 3GPP Draft; R1-144970 Views on Issues Related to LAA UL Final, 3rd Generation Partnership Project (3GPP), Mobile Competence Centre; 650, Route Des Lucioles; F-06921 Sophia-Antipolis Cedex; France; vol. RAN WG1. No. San Francisco, USA; Nov. 17, 2014-Nov. 21, 2014; Nov. 17, 2014 (Nov. 17, 2014), pp. 1-4, XP050876017, Retrieved from the Internet: URL:http://www.3gpp.org/ftp/Meetings_3GPP_SYNC/RAN1/Docs/ [retrieved on Nov. 17, 2014], the whole document.

* cited by examiner

SELF-CONTAINED TRANSMISSIONS FOR MACHINE TYPE COMMUNICATIONS

CROSS-REFERENCE TO RELATED APPLICATIONS

The present Application for Patent claims priority to U.S. Provisional Application No. 62/423,171, filed Nov. 16, 2016, which is assigned to the assignee of the present application and hereby expressly incorporated by reference herein in its entirety.

BACKGROUND

Field of the Disclosure

Aspects of the present disclosure relate to wireless communications systems and, more particularly, to procedures for transmitting and receiving self-contained transmissions for enhanced machine type communications (eMTC) in unlicensed spectrum (eMTC-U).

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access (RA)). NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as supporting beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

As the demand for mobile broadband access continues to increase, using shared radio frequency spectrum (SRFS), which may include unlicensed radio frequency spectrum (URFS), has been considered to help solve the spectrum congestion problem for future wireless needs, not only to meet the growing demand for mobile broadband access, but also to advance and enhance the user experience with mobile communications. However, the SRFS may carry other transmissions, and therefore techniques such as listen before talk (LBT) and clear channel assessment (CCA) may be used in an effort prevent excessive interference. In certain scenarios, wireless devices operating in a shared spectrum may be asynchronous. It may be desirable to mitigate interference caused by wireless devices operating in the scared spectrum.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for transmitting and receiving self-contained transmissions for enhanced machine type communications (eMTC) in unlicensed spectrum (eMTC-U) are described herein. According to aspects of the present disclosure, a BS may determine a portion of unlicensed radio frequency spectrum is available, transmit a signal to a UE (e.g., an eMTC UE) in a frame, and receive a response from the UE within the frame.

In an aspect, a method for wireless communication is provided. The method may be performed, for example, by a BS. The method generally includes determining, based on a listen before talk (LBT) procedure, that a first portion of unlicensed radio frequency spectrum is available for a frame, transmitting, on the first portion of the unlicensed radio frequency spectrum, a control channel indicating a frame format of the frame or a grant of the first portion of the unlicensed radio frequency spectrum for the frame, and communicating with a user equipment (UE) according to the frame format or the grant during the frame.

In an aspect, a method for wireless communication is provided. The method may be performed, for example, by a UE. The method generally includes detecting a signature waveform on a first portion of unlicensed radio frequency spectrum for a first period during a frame, receiving, on the first portion of the unlicensed radio frequency spectrum and during a second period subsequent to the first period, a control channel indicating a frame format of the frame or a grant of the first portion of the unlicensed radio frequency spectrum for the frame, and communicating with a base station (BS) according to the frame format or the grant during the frame.

In an aspect, an apparatus for wireless communication is provided. The apparatus generally includes a processor configured to: determine, based on a listen before talk (LBT) procedure, that a first portion of unlicensed radio frequency spectrum is available for a frame; transmit, on the first portion of the unlicensed radio frequency spectrum, a control channel indicating a frame format of the frame or a grant of the first portion of the unlicensed radio frequency spectrum for the frame; and communicate with a user equipment (UE) according to the frame format or the grant during the frame; and a memory coupled with the processor.

In an aspect, an apparatus for wireless communication is provided. The apparatus generally includes a processor configured to: detect a signature waveform on a first portion of unlicensed radio frequency spectrum for a first period during a frame; receive, on the first portion of the unlicensed radio frequency spectrum and during a second period subsequent to the first period, a control channel indicating a frame format of the frame or a grant of the first portion of the unlicensed radio frequency spectrum for the frame; and communicate with a base station (BS) according to the frame format or the grant during the frame; and a memory coupled with the processor.

In an aspect, an apparatus for wireless communication is provided. The apparatus generally includes means for determining, based on a listen before talk (LBT) procedure, that a first portion of unlicensed radio frequency spectrum is available for a frame, means for transmitting, on the first portion of the unlicensed radio frequency spectrum, a control channel indicating a frame format of the frame or a grant of the first portion of the unlicensed radio frequency spectrum for the frame, and means for communicating with a user equipment (UE) according to the frame format or the grant during the frame.

In an aspect, an apparatus for wireless communication is provided. The apparatus generally includes means for detecting a signature waveform on a first portion of unlicensed radio frequency spectrum for a first period during a frame, means for receiving, on the first portion of the unlicensed radio frequency spectrum and during a second period subsequent to the first period, a control channel indicating a frame format of the frame or a grant of the first portion of the unlicensed radio frequency spectrum for the frame, and means for communicating with a base station (BS) according to the frame format or the grant during the frame.

In an aspect, a computer-readable medium for wireless communication is provided. The computer-readable medium includes instructions that, when executed by a processor, cause the processor to perform operations generally including determining, based on a listen before talk (LBT) procedure, that a first portion of unlicensed radio frequency spectrum is available for a frame, transmitting, on the first portion of the unlicensed radio frequency spectrum, a control channel indicating a frame format of the frame or a grant of the first portion of the unlicensed radio frequency spectrum for the frame, and communicating with a user equipment (UE) according to the frame format or the grant during the frame.

In an aspect, a computer-readable medium for wireless communication is provided. The computer-readable medium includes instructions that, when executed by a processor, cause the processor to perform operations generally including detecting a signature waveform on a first portion of unlicensed radio frequency spectrum for a first period during a frame, receiving, on the first portion of the unlicensed radio frequency spectrum and during a second period subsequent to the first period, a control channel indicating a frame format of the frame or a grant of the first portion of the unlicensed radio frequency spectrum for the frame, and communicating with a base station (BS) according to the frame format or the grant during the frame.

Aspects of the present disclosure provide apparatus, methods, processing systems, and computer readable mediums for transmitting and receiving self-contained transmissions for eMTC in unlicensed spectrum.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
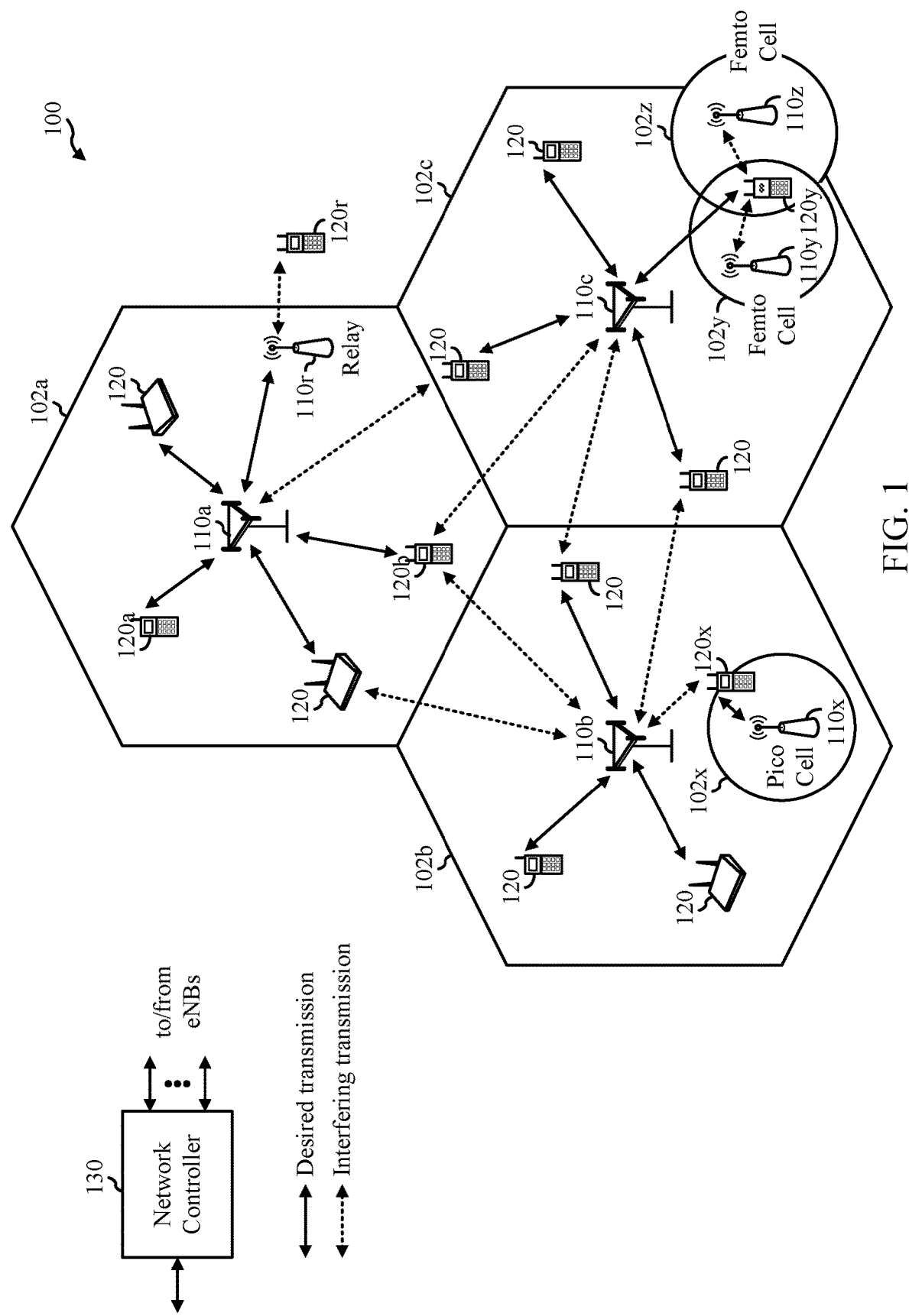
FIG. 1 is a block diagram conceptually illustrating an example telecommunications system, according to aspects of the present disclosure.

Aspects of the present disclosure provide apparatus, methods, processing systems, and computer readable mediums for transmitting and receiving self-contained transmissions for enhanced machine type communications (eMTC) in unlicensed spectrum (eMTC-U). As described herein, according to aspects of the present disclosure, a base station (BS) may determine that a portion of unlicensed spectrum is available and transmit a signal to a user equipment (UE) in a frame, and the UE may reply to the transmission in the same frame. For example, a BS may perform a listen before talk (LBT) procedure, transmit a physical downlink control channel (PDCCH) granting one or more subframes for transmission of a physical downlink shared channel (PDSCH) to a UE, and transmit the PDSCH in the same frame. In the example, the UE may receive and decode the PDCCH, determine that the UE has a grant in the PDCCH, receive the PDSCH, and acknowledge the PDSCH via a PUSCH in the frame.

For illustrative purposes, aspects are described with reference to a BS serving at a transmitter and a UE serving as a receiver. However, aspects of the present disclosure are not so limited. For example, a UE associated with a first operator, acting as BS may receive clear CET information associated with a wireless device of a second operator and may protect one or more CET transmissions of the wireless device based, at least in part, on the received information.

According to aspects, on the downlink, a discovery signal or paging signal may be transmitted during a CCA exempt transmission (CET transmission), without a clear channel assessment (CCA). A discovery signal and paging signal are example of transmissions on common or overhead channels. As described herein, a transmitter may protect transmissions on common or overhead channels used by other transmitters.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

For clarity, while aspects may be described herein using terminology commonly associated with 3G and/or 4G wireless technologies, aspects of the present disclosure can be applied in other generation-based communication systems, such as 5G and later, including NR technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Example Wireless Communications System

FIG. 1 illustrates an example wireless network 100 in which aspects of the present disclosure may be performed. For example, the wireless network may be new radio (NR) or 5G network. BSs 110 in the network may be asynchronous and/or may be associated with different operators. UEs 120a may detect and measure signals from BS associated with different operators. In this manner, a receiver-UE may detect signals from a second transmitter-BS that is "hidden" or not detected by a first BS. In response, the first BS may protect certain transmissions of the second transmitter, such as, for example, paging occasions and/or discovery signals and/or any transmission on a common or overhead channel. In this manner, a UE served by the second BS may receive control and/or overhead information with reduced interference.

The BS 110 may be configured to perform the operations 600 and the UE 120 (e.g., UE 120a) may be configured to perform the operations 700. Furthermore, the BS 110a and the UE 120a may be configured to perform other aspects described for protecting transmissions in a shared spectrum, which are described in more detail herein.

The system illustrated in FIG. 1 may be, for example, a long term evolution (LTE) network. The wireless network 100 may include a number of Node Bs (e.g., eNodeBs, eNBs, 5G Node B, etc.) 110 and other network entities. A Node B may be a station that communicates with the UEs and may also be referred to as a base station, an access point, or a 5G Node B.

Each Node B 110 may provide communication coverage for a particular geographic area. In 3GPP, the term "cell" can refer to a coverage area of a Node B and/or a Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110a, 110b and 110c may be macro Node Bs for the macro cells 102a, 102b and 102c, respectively. The Node B 110x may be a pico Node B for a pico cell 102x. The Node Bs 110y and 110z may be femto Node Bs for the femto cells 102y and 102z, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110r may communicate with the Node B 110a and a UE 120r in order to facilitate communication between the Node B 110a and the UE 120r. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such central units or distributed units.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
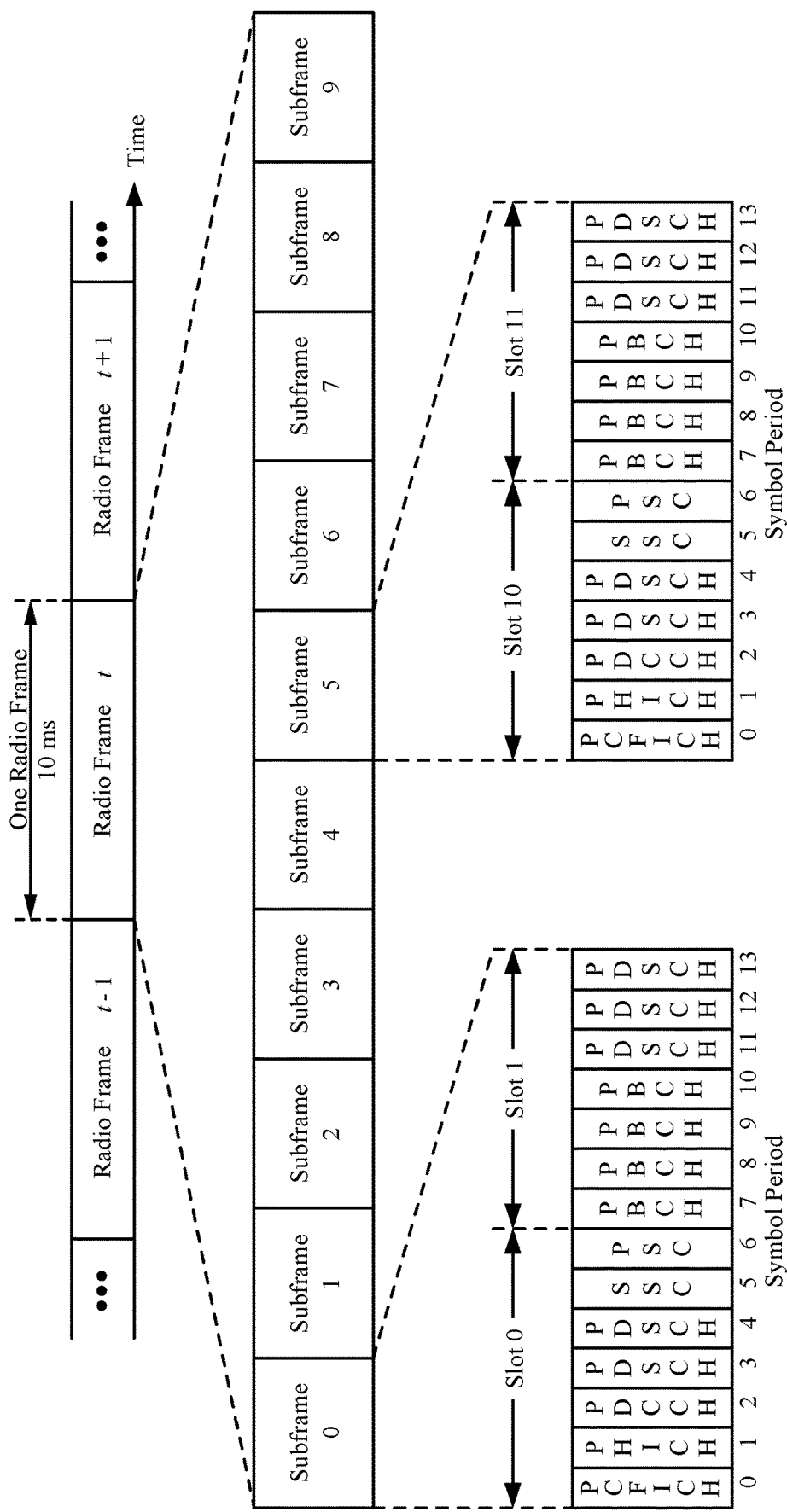
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L-1. The available time frequency resources may be partitioned into resource blocks. Each resource block may cover N subcarriers (e.g., 12 subcarriers) in one slot.

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The Node B may send a Physical Downlink Shared Channel (PDSCH) in the remaining symbol periods of each sub-frame. The PDSCH may carry data for UEs scheduled for data transmission on the downlink.

The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

A UE may be within the coverage of multiple Node Bs. One of these Node Bs may be selected to serve the UE. The serving Node B may be selected based on various criteria such as received power, path loss, signal-to-noise ratio (SNR), etc.

Figure 3:
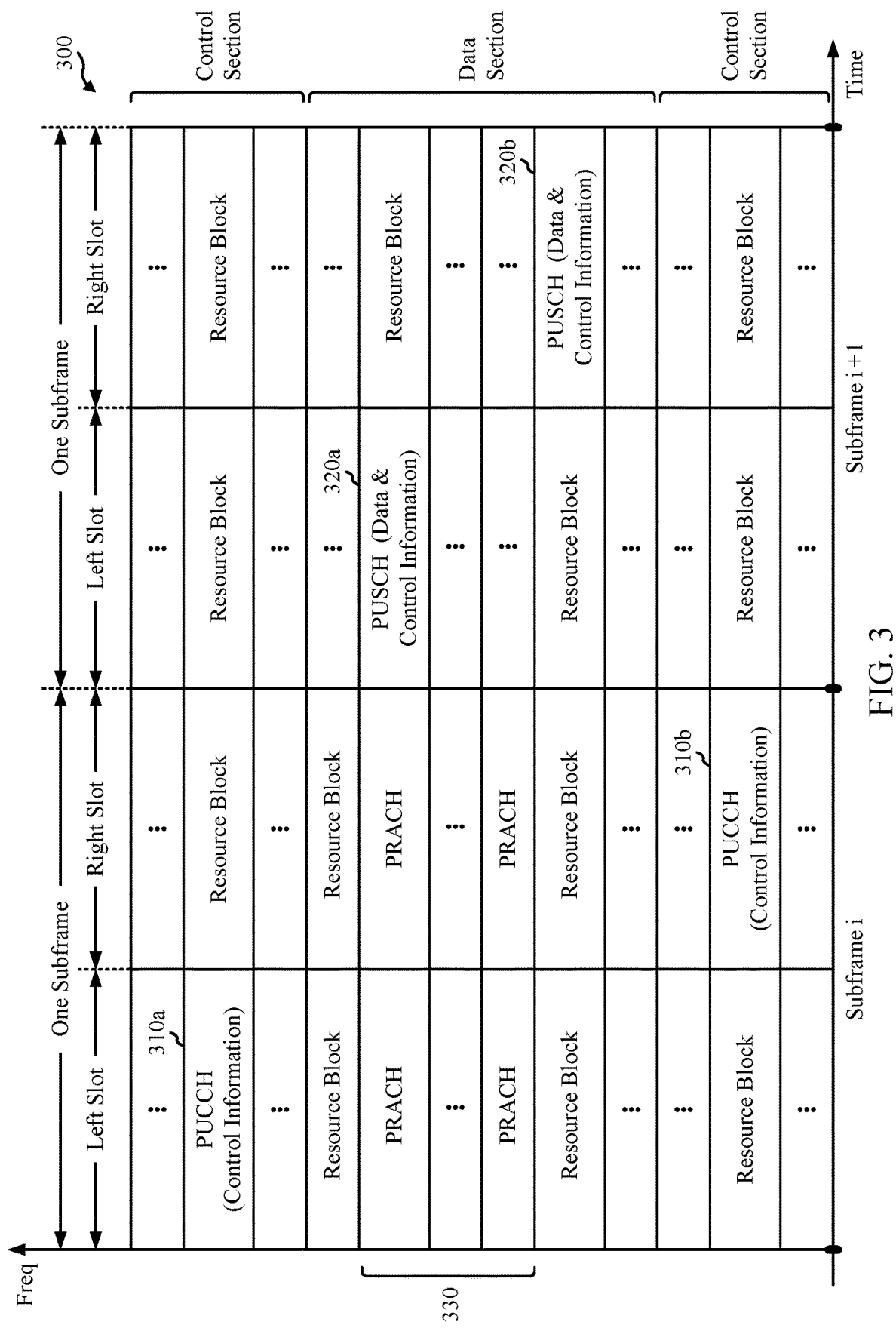
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a Node B. The UE may also be assigned resource blocks 320a, 320b in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
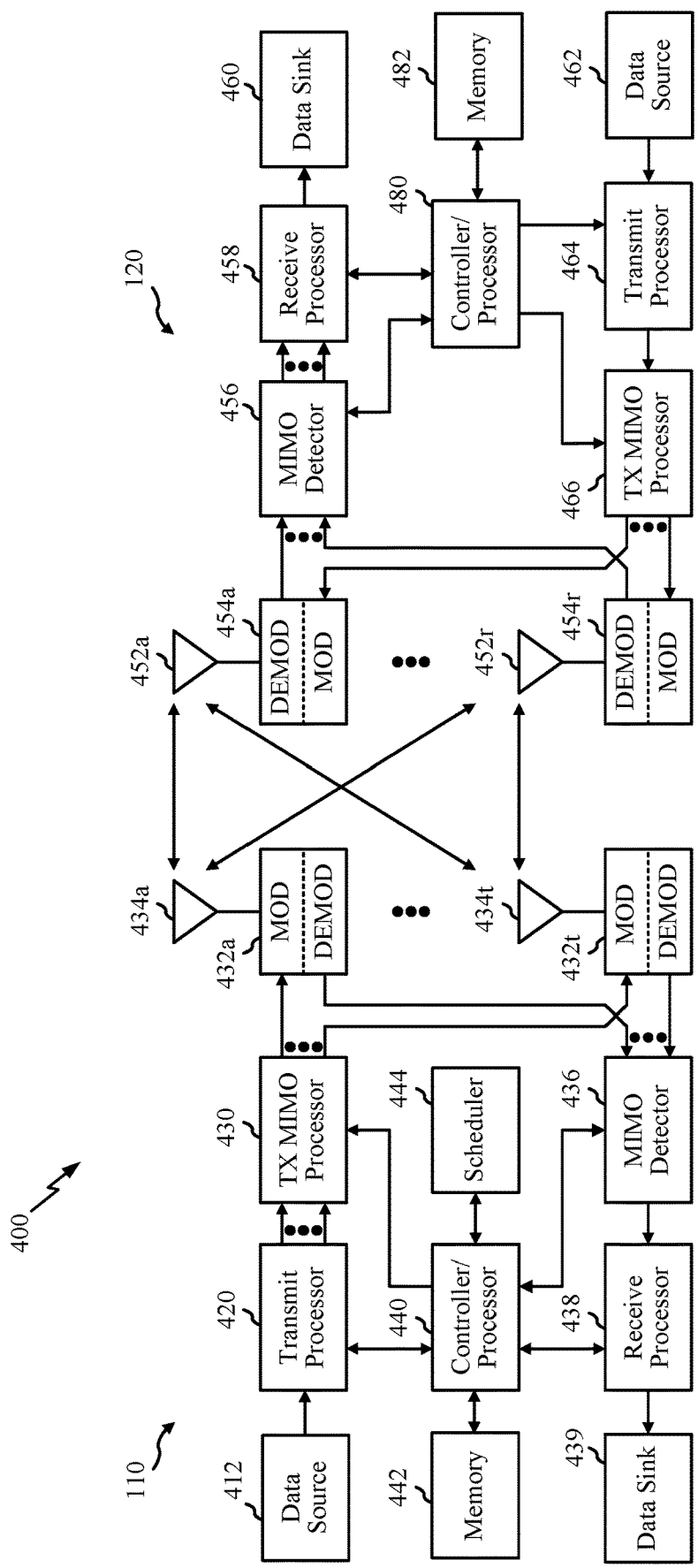
FIG. 4 is a block diagram conceptually illustrating a design of an example Node B and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 6-8. The BS 110 may comprise a TRP.

FIG. 4 shows a block diagram of a design of a base station/Node B/TRP 110 and a UE 120, which may be one of the base stations/Node Bs/TRPs and one of the UEs in FIG. 1. For a restricted association scenario, the base station 110 may be the macro Node B 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein and those illustrated in the appended drawings. The processor 480 and/or other processors and modules at the UE 120 may also perform or direct, e.g., the execution of various processes for the techniques described herein and those illustrated in the appended drawings. A scheduler 444 may schedule UEs for data transmission on the downlink and/or uplink.

New radio (NR) may refer to radios configured to operate according a wireless standard, such as 5G (e.g. wireless network 100). NR may include Enhanced mobile broadband (eMBB) targeting wide bandwidth (e.g. 80 MHz and beyond), millimeter wave (mmW) targeting high carrier frequency (e.g. 27 GHz and higher), massive MTC (mMTC) targeting non-backward compatible MTC techniques, and mission critical targeting ultra reliable low latency communications (URLLC).

NR cell may refer to a cell operating according in the NR network. A NR Node B (e.g., Node B 110) may correspond to one or multiple transmission reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., network controller 130). The CU may be an Access node controller (ANC). The CU terminates backhaul interface to RAN-CN, terminates backhaul interface to neighbor RAN node. The RAN may include a distributed unit that may be one or more TRPs that may be connected to one or more ANCs (not shown). TRPs may advertise System Information (e.g., Global TRP ID), may include PDCP/RLC/MAC functions, may comprise one or more antenna ports, may be configured to individually (dynamic selection) or jointly (joint transmission), and may serve traffic to the UE.

Example deployment scenarios for a shared spectrum, which may include use of an unlicensed radio frequency spectrum, may include operator-based deployments, a stand-alone mode of operation, and/or a dual-connectivity mode of operation. In an operator-based deployment, multiple operators may share a same frequency band. A stand-alone mode of operation may include inter-public land mobile network (PLMN) handover from a licensed carrier. A dual-connectivity mode of operation may include connectivity to a shared spectrum component carrier and to an anchor carrier on licensed spectrum.

Medium access in an unlicensed spectrum may involve a dynamic listen before talk (LBT) procedure. Dynamic LBT procedures may allow sharing of network resources (e.g., frequency resources) on millisecond time scale. However, access to the medium may not be guaranteed, for example, in an asynchronous system. For asynchronous operation, the Node Bs (BSs) may have different frame timings, and transmissions from different Node Bs may not be aligned in time (e.g., one or more subframe and/or frame boundaries of different Node Bs may not be contemporaneously aligned).

A Wi-Fi asynchronous system design may be optimized for dynamic LBT procedures. In a Wi-Fi system, beacon transmissions (overhead signals, reference signals) may be subject to LBT. The periodic beacon signals may be "asynchronous" in nature. Beacon transmissions may not be transmitted frequently and receiving stations (STAs) may trigger asynchronous transmission of beacons in a Wi-Fi system.

STA-based mobility may be needed in an effort to compensate for poor radio resource management (RRM) due to, for example, the asynchronous nature of beacon transmissions. Data transmissions may each contain a preamble which may be used for synchronization and detection of the data burst.

Example Self-Contained Transmissions for Machine Type Communications

For wireless communications in unlicensed spectrum, comparing regulatory requirements for base stations (e.g., eNBs) transmitting with frequency hopping versus base stations transmitting without frequency hopping reveals that transmitting with frequency hopping enables longer DL and UL transmissions. That is, a frequency hopped transmission may be transmitted for a longer period without violating regulatory requirements than a transmission that does not frequency hop. Without frequency hopping, the maximum transmission time in many regulatory regimes is 5 milliseconds (ms) without using LBT and 10 to 13 ms when using LBT.

There may be a significant benefit obtained by allowing long DL transmissions, for example, longer than 10 ms.

According to aspects of the present disclosure, when operating in unlicensed spectrum and using self-contained transmissions, a building block of most PHY transmissions from a base station for data may be either a combination of a PDCCH scheduling a PDSCH, the PDSCH, and receiving an ACK (e.g., from a UE) acknowledging the PDSCH or a combination of a PDCCH scheduling a PUSCH (e.g., from a UE) and receiving the PUSCH.

According to aspects of the present disclosure, transmission of SIBs and paging messages may be included in the above described building blocks, as SIB2 and above are transmitted on PDSCH.

According to aspects of the present disclosure, SIB1 may also be transmitted on PDSCH and occurs at pre-determined time and frequency locations, but is not scheduled by PDCCH.

According to aspects of the present disclosure, a random access channel (RACH) procedure is provided that fits within the overall framework of the present disclosure.

According to aspects of the present disclosure, either of the two building blocks described above (e.g., a combination of a DL PDCCH scheduling a PDSCH, the PDSCH and an ACK of the PDSCH or a combination of a DL PDCCH scheduling a PUSCH and the PUSCH) may be transmitted in a single frame, if a number of repetitions of each of the transmissions (e.g., PDCCH, PDSCH, and ACK; or PDCCH and PUSCH) used to enable a coverage level of a cell can be transmitted within the frame.

According to aspects of the present disclosure, uplink transmissions may be transmitted in periods referred to as transmission units (TUs) of a frame. Each transmission unit may be, for example, 10 milliseconds (ms) long, with a transmitter of a UE on for 5 ms and off for 5 ms (e.g., in order to meet regulatory requirements for transmissions without LBT procedures in unlicensed radio frequency spectrum). According to aspects of the present disclosure, PUSCH transmissions may be spread over multiple frames, as the transmission duty cycle of UEs is limited to 5 ms ON (e.g., transmitting) and 5 ms OFF (e.g., not transmitting) in every transmission unit.

According to aspects of the present disclosure, transmitting PUSCH via multiple subframes may be beneficial if coverage extension or larger payload is needed on UL. That is, if a UE is in a coverage enhancement condition in a cell, the UE may transmit a PUSCH in multiple subframes within a transmission unit to improve a probability that a receiving BS will successfully receive and decode the PUSCH. Similarly, if a UE has more data to transmit than the UE can fit in a single PUSCH, the UE may split the data between multiple PUSCHs transmitted in subframes in a TU.

According to aspects of the present disclosure, a UE is assured to have a PUSCH transmission opportunity in unlicensed radio frequency spectrum after receiving an UL PDCCH, because the UE does not perform LBT before attempting to transmit a PUSCH. Assuring a UE has a PUSCH transmission opportunity makes most transmissions self-contained within a frame or multiple frames when DL heavy frames are available.

According to aspects of the present disclosure, maximum coverage level (MCL) of a cell using unlicensed radio frequency spectrum may be limited by a maximum number of DL subframes that can be continuously transmitted within a frame.

Having a self-contained structure with implicit guarantee on completing a two-way exchange between a BS and a UE when the BS transmits on the DL is a basic operating principle for operating a wireless communications system in unlicensed radio frequency spectrum, according to aspects of the present disclosure.

Figure 5:
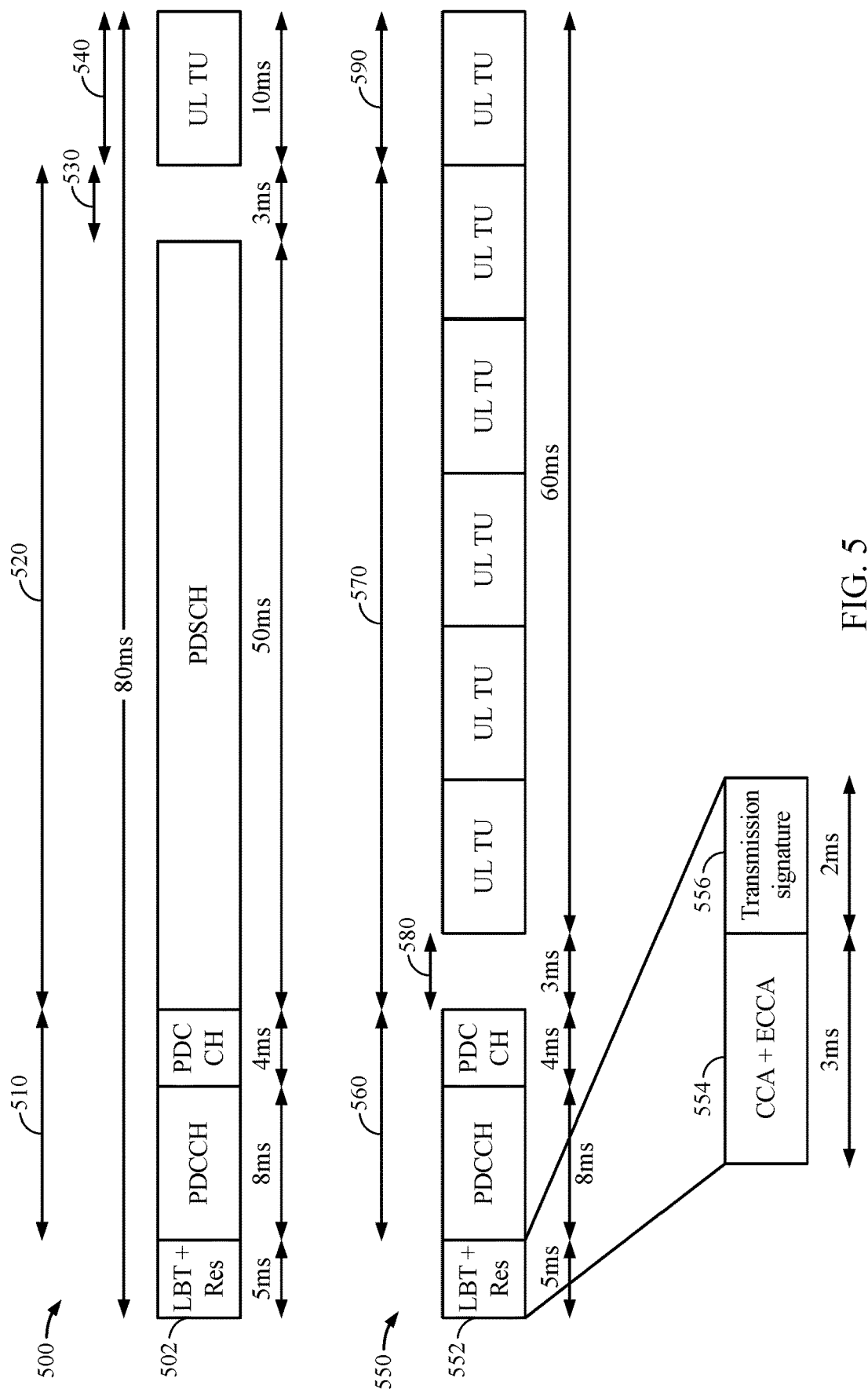
FIG. 5 shows exemplary frames, according to aspects of the present disclosure.

FIG. 5 shows an exemplary DL frame 500 and an exemplary UL frame 550, according to aspects of the present disclosure. The exemplary DL frame begins with a period 502 for LBT and transmission of a signature waveform by a BS (e.g., a BS serving a cell). Transmission of a signature waveform by the BS may enable a UE to detect transmissions after the signature waveform. The exemplary UL frame also begins with a period 552 for LBT and transmissions of a signature waveform by the BS. The period 552 may be divided into a period 554 for performance of a clear channel assessment and/or an enhanced clear channel assessment (eCCA) and a period 556 for transmission of the signature waveform. The period 502 of the DL subframe may be similarly divided, though the division is not shown.

Following the period 502 in the DL subframe is a period 510 for downlink transmissions. As shown, the period 510 may include two periods for transmission of different PDCCHs, although the period 510 may be subdivided into more or fewer periods. A UE operating in such a cell searches the period 510 for downlink grants indicating transmissions to the UE in the frame or that the UE is to transmit to the BS. In addition, the BS may transmit one or more reference signals (RS) during the period 510. A UE receiving the reference signals may measure the RS, for example, to determine CSI. In the UL subframe 550, the period 552 is similarly followed by a period 560 for DL transmissions, including grants and RS.

Following the period 510 in the DL subframe is a flexible portion 520 of the subframe that may be used for DL transmissions, UL transmissions, or a combination of DL and UL transmissions. A BS may determine a fraction of the flexible portion 520 that is to be used for DL transmissions and signal that fraction in one or more of the DL transmissions during the period 510. A UE receiving the DL transmissions may determine the fraction from the DL transmissions and determine, based on the fraction when to switch off a receiver of the UE and begin transmitting in UL TUs, if the UE received a grant for a transmission. Because the exemplary frame 500 is a DL frame, almost the entire portion 520 is used for transmitting one or more DL signals (e.g., PDSCHs) by the BS. A period 530, between the end of the flexible portion 520 used for DL transmissions and the beginning of a TU 540 for UL transmissions, is used for neither DL nor UL transmissions, allowing the BS to switch from transmitting to receiving. Similarly, UEs may switch from receiving to transmitting during the period 530. In the exemplary UL subframe 550, a flexible portion 570 of the subframe follows the period 560. Because the exemplary frame 550 is an UL frame, almost the entire portion 570 is divided into UL TUs that may have been granted to various UEs by grants transmitted during the period 560. The UL TUs in the portion 570 may be used by UEs for transmitting PUSCHs, scheduling requests, sounding reference signals (SRS), channel quality indicator (CQI), channel state information (CSI) reports, and physical random access channels (PRACHs), for example. A period 580, between the end of the period 560 and the beginning of a first UL TU in the flexible portion 570, is not used for DL or UL transmissions. As above with period 530, period 580 allows the BS to switch from transmitting to receiving, and UEs may switch from receiving to transmitting during period 580.

After the flexible portion 520, an UL TU 540 occurs in the exemplary DL subframe 500. The UL TU or portions (e.g., subframes) of the UL TU may be granted to one or more UEs by the BS for transmission of PUSCHs, scheduling requests, SRS, CQI, CSI, and PRACHs, for example. In the exemplary UL subframe 550, an UL TU 590 occurs after the flexible portion 570. As with the exemplary DL subframe, the UL TU may be used for a variety of UL transmissions.

While FIG. 5 shows an exemplary DL frame 500 with all of the flexible portion 520 dedicated to DL transmissions and an exemplary UL frame 550 with all of the flexible portion 570 dedicated to UL transmissions, the present disclosure is not so limited. According to aspects of the present disclosure, the flexible portion of a frame may be divided between DL transmissions and UL transmissions. A BS may transmit an indication of the division the flexible portion of a frame, then use the indicated part of that flexible portion for DL transmissions and granting other parts (e.g., UL TUs) of the flexible portion to UEs for uplink transmissions.

According aspects of the present disclosure, if a UE detects a transmission (e.g., a signature waveform) from a BS (e.g., an eNB) in a frame, then the UE searches for PDCCH in the guaranteed DL subframes, e.g., periods 510 and 560, shown in FIG. 5.

According to aspects of the present disclosure, a number of guaranteed DL subframes (e.g., periods 510 and 560 shown in FIG. 5) in a frame is at least as needed to cover one UE specific search space with a certain number of repetitions. The maximum number of repetitions in one frame in a cell may determine a PDCCH coverage enhancement level for that cell and hence the overall system coverage.

According to aspects of the present disclosure, PDCCH repetitions are not spread across multiple frames, each of which is subject to an independent LBT. That is, communication systems operating according to aspects of the present disclosure may transmit sufficient PDCCH repetitions to achieve a coverage enhancement level of a cell while performing a single LBT procedure, because the communications system transmits all of the PDCCH repetitions in a single frame following the single LBT procedure. This may be advantageous when compared with previously known communications systems that may require multiple LBT procedures when transmitting PDCCH repetitions.

According to aspects of the present disclosure, if a UE detects a DL grant, then a PDSCH corresponding to that DL grant is contained within the current frame.

In a communication system operating according to the present disclosure, depending on the timeline, HARQ acknowledgments (HARQ-ACKs) of a PDSCH or other DL transmission may be transmitted either on UL subframes (e.g., in UL TUs) in a same frame as the DL transmission, in a next frame, or in both frames if more repetitions are needed than the UE can transmit in the same frame.

According to aspects of the present disclosure, UL transmissions (e.g., from a UE) are not subject to LBT (e.g., due to the short length of the UL transmissions) and hence an UL transmission can be transmitted in a next frame after a DL PDCCH with certainty.

According to aspects of the present disclosure, SRS, scheduling request (SR) and PRACH resources can be configured in UL guaranteed subframes (e.g., during periods 540 and 590 in FIG. 5) in a frame.

According to aspects of the present disclosure, for UL frames, an UL grant and a corresponding PUSCH transmission ends the frame, and there is no further acknowledgement from the eNB. Thus, the communications system may be considered to be operating with asynchronous HARQ for UL transmissions.

In aspects of the present disclosure, if more repetitions are needed than a UE can transmit in a frame, then the UE can use one or more next frames for additional repetitions, as the UE is assured of being able to perform UL transmission, because the UE does not perform LBT for UL transmissions.

According to aspects of the present disclosure, if a BS (e.g., an eNB) does not win the medium in a frame, then both the BS and any UEs in a cell skip the frame and move to a next frame (e.g., waiting for the next frame) and/or frequency.

In aspects of the present disclosure, if a UE does not detect a DL transmission from a BS, then the BS does not detect an ACK, CSI, SRS, and/or PUSCH from the UE, because the UE will not transmit these signals without receiving and processing a DL signal from the BS. Thus, the BS and the UE are generally in sync.

According to aspects of the present disclosure, if a large DL payload is to be sent, then a BS (e.g., an eNB) must break up the DL payload into chunks small enough to enable a receiving UE to receive each chunk within a frame. This may cause higher overhead in some transmissions, but self-contained transmissions (i.e., according to aspects of the present disclosure) provide synchronization between eNB and UE, which may be more crucial in the unlicensed spectrum, especially with repetitions, than the increased overhead.

According to aspects of the present disclosure and as mentioned above, a RACH procedure can be fit within the overall framework for self-contained transmissions. For example, a UE transmits Msg 1 of a RACH procedure in some available PRACH resources in a frame or in multiple frames, if a large number of repetitions of Msg 1 are needed, due to the coverage enhancement level of the UE. In the example, a BS transmits Msg 2 in a PDSCH scheduled by a PDCCH in a frame in which the BS clears the medium (e.g., by performing an LBT procedure) within a first window (e.g., a first threshold number of frames) after the BS receives the Msg 1 transmission. Continuing the example, the UE transmits Msg 3 of the RACH procedure (via a PUSCH) in the next frame (or frames) after the UE receives Msg 2, as the UE is able to transmit without completing an LBT procedure. Still in the example, the BS transmits Msg 4 of the RACH procedure in a PDSCH, scheduled by a PDCCH and acknowledged by an ACK, in a frame within a second window (e.g., a second threshold number of frames) after the BS receives Msg 3 of the RACH procedure. Thus, in the RACH procedure according to the present disclosure, each transmission by a BS (e.g., an eNB) is responded to by the UE response in a deterministic fashion. Threshold windows for responses are used for the BS transmissions, but not for the UE transmissions.

According to aspects of the present disclosure, measurement reference signals for radio resource management (RRM) may be transmitted in the DL guaranteed subframes (e.g., periods 510 and 560 shown in FIG. 5). If a UE needs to monitor measurements of a different cell than the serving cell of the UE (e.g., in preparation for handing over to the different cell), then the UE tunes a receiver of the UE to a frequency on which transmissions from the neighbor cell are expected to be present and checks for BS transmissions.

In aspects of the present disclosure, a neighbor cell frequency hopping pattern can be indicated in a transmission by a BS of a serving cell of a UE. The UE can determine a frequency to listen on in order to detect the BS serving the neighbor cell. If the BS serving the neighbor cell is transmitting, then the UE can perform RRM based on reference signals transmitted in the DL guaranteed subframes.

According to aspects of the present disclosure, when a UE is performing measurement of a neighbor cell, the UE may not attempt to receive from the serving cell of the UE for an entire frame, and the UE can attempt to receive from the serving cell in a next frame.

Communications systems using self-contained transmissions may provide superior service to UEs in coverage extension conditions than other communications systems. However, communications systems using self-contained transmissions may reduce peak data rates for a UE in good coverage, because only one HARQ process can be scheduled per frame for the UE in good coverage.

Figure 6:
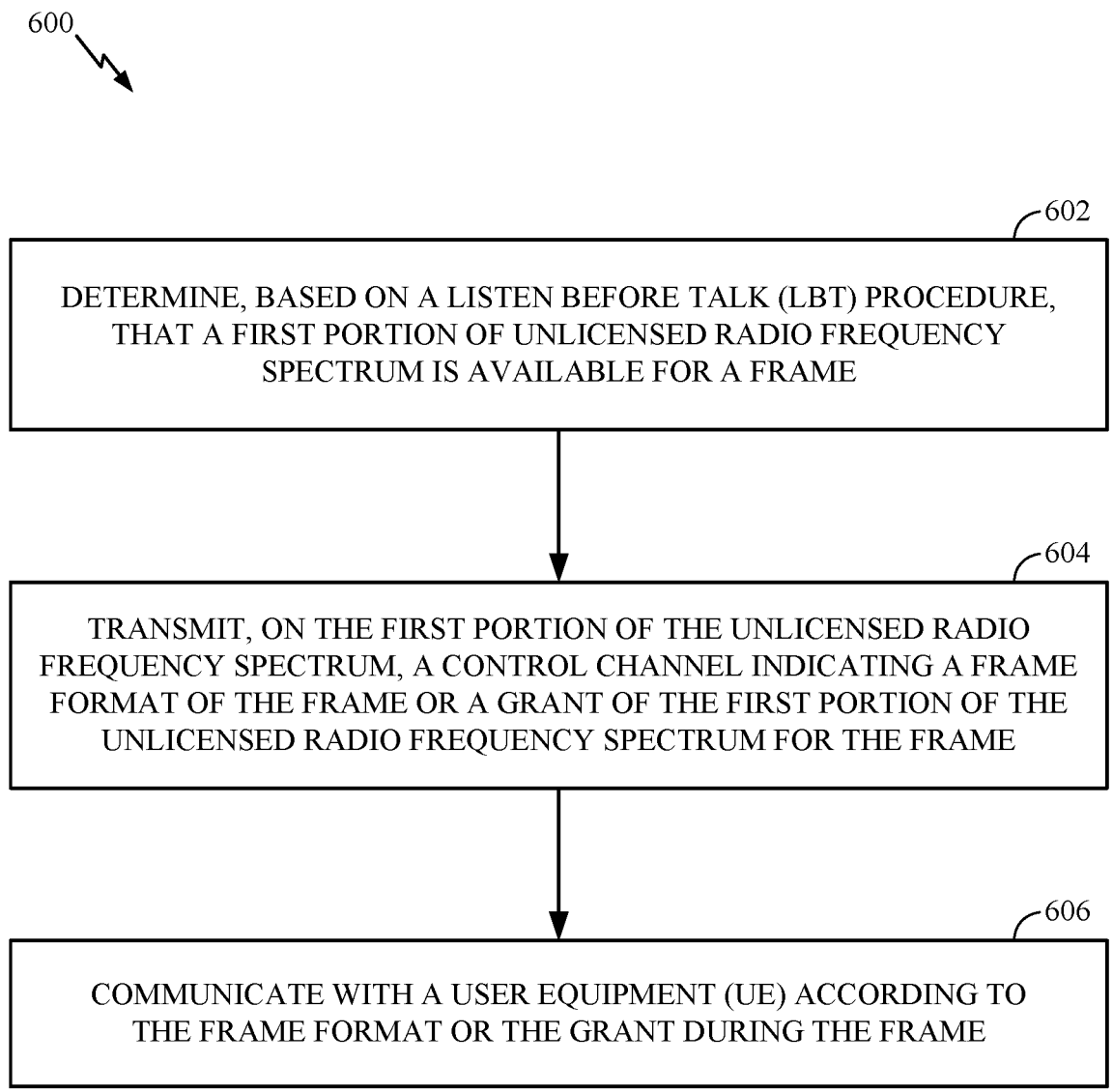
FIG. 6 illustrates example operations, which may be performed by a BS, in accordance with aspects of the present disclosure.

FIG. 6 illustrates example operations 600 for wireless communications, which may be performed by a BS (e.g., eNB 110 shown in FIG. 1), in accordance with aspects of the present disclosure. The BS may operate in a wireless system as illustrated in FIG. 1 and may include one or more components shown in FIG. 4.

At block 602, operations 600 begin with the BS determining, based on a listen before talk (LBT) procedure, that a first portion of unlicensed radio frequency spectrum is available for a frame. For example, eNB 110 determines, based on an LBT procedure that the eNB performs (e.g., in period 502 in DL frame 500 in FIG. 5), that a first portion of unlicensed radio frequency spectrum is available for a frame.

At block 604, operations 600 continue with the BS transmitting, on the first portion of the unlicensed radio frequency spectrum, a control channel indicating a frame format of the frame or a grant of the first portion of the unlicensed radio frequency spectrum for the frame. Continuing the example from above, the eNB 110 transmits a control channel (e.g., a PDCCH) indicating a grant of the first portion of the unlicensed radio frequency spectrum (e.g., a grant indicating a PDSCH for UE 120 will be transmitted on the first portion of the unlicensed radio frequency spectrum) for the frame.

At block 606, operations 600 continue with the BS communicating with a user equipment (UE) according to the frame format or the grant during the frame. Still in the example from above, the eNB 110 transmits a PDSCH according to the grant the eNB transmitted at block 604.

Figure 7:
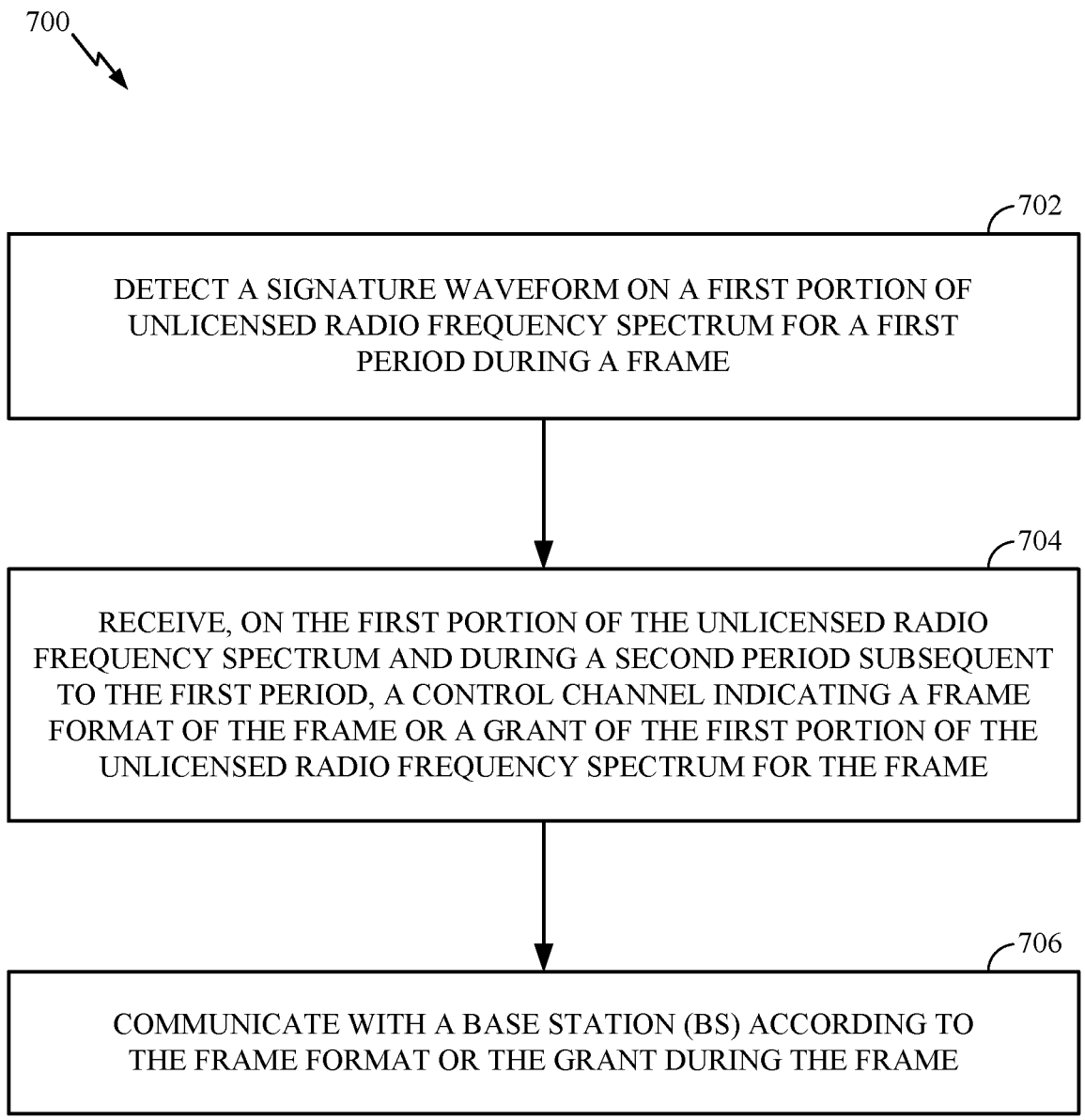
FIG. 7 illustrates example operations, which may be performed by a UE, in accordance with aspects of the present disclosure.

FIG. 7 illustrates example operations 700, which may be performed by a UE (e.g., UE 120 shown in FIG. 1), in accordance with aspects of the present disclosure. The UE may operate in a wireless system as illustrated in FIG. 1 and may include one or more components shown in FIG. 4.

At block 702, operations 700 begin with the UE detecting a signature waveform on a first portion of unlicensed radio frequency spectrum for a first period during a frame. For example, UE 120 detects a signature waveform on a first portion of unlicensed radio frequency spectrum for a first period (e.g., period 556 in FIG. 5).

At block 704, operations 700 continue with the UE receiving, on the first portion of the unlicensed radio frequency spectrum and during a second period subsequent to the first period, a control channel indicating a frame format of the frame or a grant of the first portion of the unlicensed radio frequency spectrum for the frame. Continuing the example from above, the UE 120 receives, on the first portion of the unlicensed radio frequency spectrum and during a second period (e.g., periods 510 or 560 in FIG. 5), a control channel (e.g., a PDCCH) indicating a grant of the first portion of the unlicensed radio frequency spectrum (e.g., a grant indicating a PDSCH will be transmitted for the UE) for the frame.

At block 706, the UE may communicate with a base station (BS) according to the frame format or the grant during the frame. Still in the example from above, the UE 120 receives a PDSCH according to the grant the UE received at block 704.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for processing, means for indicating, and/or means for including, may comprise a processing system, which may include one or more processors, such as the transmit processor 420, the TX MIMO processor 430, and/or the controller/processor 440 of the BS 110 illustrated in FIG. 4, and/or the transmit processor 464, the TX MIMO processor 466, and/or the controller/processor 480 of the user equipment 120 illustrated in FIG. 4. Means for transmitting and/or means for sending may comprise a transmitter, which may include the transmit processor 420, the TX MIMO processor 430, the modulators 432, the controller/processor 440, and/or the antenna(s) 434 of the BS 110 illustrated in FIG. 4, and/or the transmit processor 464, the TX MIMO processor 466, the modulators 454, the controller/processor 480, and/or the antenna(s) 452 of the user equipment 120 illustrated in FIG. 4. Means for receiving and/or means for detecting may comprise a receiver, which may include the receive processor 458, the MIMO detector 456, the demodulators 454, the controller/processor 480, and/or the antenna(s) 452 of the UE 120 illustrated in FIG. 4, and/or the receive processor 438, the MIMO detector 436, the demodulators 434, the controller/processor 440, and/or the antenna(s) 432 of the base station 110 illustrated in FIG. 4. Means for communicating may comprise a transmitter and/or a receiver, which may include the transmit processor 420, the TX MIMO processor 430, the modulators 432, the controller/processor 440, the antenna(s) 434, the receive processor 438, the MIMO detector 436, and/or the demodulators 434 of the base station 110 illustrated in FIG. 4 and/or the transmit processor 464, the TX MIMO processor 466, the modulators 454, the controller/processor 480, and/or the antenna(s) 452, the receive processor 458, the MIMO detector 456, and/or the demodulators 454 of the UE 120 illustrated in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PI-W layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:
1. A method for wireless communications by a base station (BS), comprising:
   determining, based on a listen before talk (LBT) procedure, that a first portion of unlicensed radio frequency spectrum is available for a first frame;
   transmitting, on the first portion of the unlicensed radio frequency spectrum, a control channel indicating:
      a frame format of the first frame, or
      a grant of the first portion of the unlicensed radio frequency spectrum for the first frame; and
   communicating with a user equipment (UE) according to the frame format or the grant during the first frame;
   wherein:
      the control channel comprises a first physical downlink control channel (PDCCH) that indicates the grant and the grant indicates the BS will transmit a first physical downlink shared channel (PDSCH) to the UE, and the method further comprises:
      receiving a first physical random access channel (PRACH) message from the UE during the first frame;
      transmitting, on the first portion or a second portion of the unlicensed radio frequency spectrum, a second PDCCH allocating resources for a second PDSCH during a second frame subsequent to the first frame; and
      transmitting, on the first portion or the second portion of the unlicensed radio frequency spectrum, the second PDSCH during the second frame, wherein the second PDSCH comprises a second PRACH message responsive to the first PRACH message.
2. The method of claim 1, wherein:
   the communicating with the UE comprises:
      transmitting the first PDSCH on the first portion of the unlicensed radio frequency spectrum during the first frame, and
      receiving an acknowledgment (ACK) of the first PDSCH on the first portion of the unlicensed radio frequency spectrum from the UE during the first frame or subsequent to the first frame.

3. The method of claim 1, wherein:
the grant further indicates that the UE should transmit a physical uplink shared channel (PUSCH) to the BS, and
the communicating with the UE comprises receiving the PUSCH from the UE on the first portion of the unlicensed radio frequency spectrum during the first frame or during a subsequent frame.

4. The method of claim 1, further comprising:
determining the first portion of the unlicensed radio frequency spectrum based on a frequency hopping pattern of the BS.

5. A method for wireless communications by a base station (BS), comprising:
determining, based on a listen before talk (LBT) procedure, that a first portion of unlicensed radio frequency spectrum is available for a first frame;
transmitting, on the first portion of the unlicensed radio frequency spectrum, a control channel indicating:
a frame format of the first frame, or
a grant of the first portion of the unlicensed radio frequency spectrum for the first frame; and
communicating with a user equipment (UE) according to the frame format or the grant during the first frame;
wherein the LBT procedure comprises:
attempting to receive a signal on the first portion of the unlicensed radio frequency spectrum for a first period at the beginning of the first frame;
determining the signal was not received; and
transmitting a signature waveform on the first portion of the unlicensed radio frequency spectrum for a second period immediately after the first period.

6. The method of claim 1, wherein:
the frame format comprises a guaranteed downlink (DL) portion, a guaranteed uplink (UL) portion, and a flexible portion, and
the control channel indicates a fraction of the flexible portion will be for DL transmissions, wherein a remaining fraction of the flexible portion will be for UL transmissions.

7. The method of claim 1, further comprising:
indicating resources for at least one of a sounding reference signal (SRS) resource, a scheduling request resource, a hybrid automatic repetition request (HARQ) acknowledgment (HARQ-ACK) resource, or a channel quality indicator (CQI) reporting resource in the control channel; and
receiving at least one of an SRS via the SRS resource, a scheduling request via the scheduling request resource, a HARQ-ACK via the HARQ-ACK resource, or a CQI report via the CQI reporting resource during the first frame.

8. The method of claim 1, wherein the method further comprises:
indicating resources for the first PRACH message in the first PDCCH; and
receiving the first PRACH message from the UE on the indicated resources during the first frame.

9. The method of claim 1, further comprising:
determining, based on a second listen before talk (LBT) procedure, that the first portion or the second portion of the unlicensed radio frequency spectrum is available for the second frame.

10. The method of claim 9, further comprising:
receiving a third PRACH message from the UE;
determining, based on a third listen before talk (LBT) procedure, that the first portion, the second portion, or a third portion of unlicensed radio frequency spectrum is available for a third frame subsequent to the second frame;
transmitting, on the first portion, the second portion, or the third portion of the unlicensed radio frequency spectrum, a third PDCCH allocating resources for a third PDSCH during the third frame; and
transmitting, on the first portion, the second portion, or the third portion of the unlicensed radio frequency spectrum, the third PDSCH during the third frame, wherein the third PDSCH comprises a fourth PRACH message responsive to the third PRACH message.

11. The method of claim 1, further comprising:
transmitting at least one reference signal on the first portion of the unlicensed radio frequency spectrum during the first frame.

12. The method of claim 1, further comprising:
transmitting an indication of a frequency hopping pattern of a cell neighboring the BS.

13. A method for wireless communications by a user equipment (UE), comprising:
detecting a signature waveform on a first portion of unlicensed radio frequency spectrum for a first period during a first frame;
receiving, on the first portion of the unlicensed radio frequency spectrum and during a second period subsequent to the first period, a control channel indicating:
a frame format of the first frame, or
a grant of the first portion of the unlicensed radio frequency spectrum for the first frame; and
communicating with a base station (BS) according to the frame format or the grant during the first frame;
wherein:
the control channel comprises a first physical downlink control channel (PDCCH) that indicates the grant, the grant indicates the BS will transmit a physical downlink shared channel (PDSCH) to the UE, and the method further comprises:
transmitting a first physical random access channel (PRACH) message during the first frame;
receiving, on the first portion or a second portion of the unlicensed radio frequency spectrum, a second PDCCH allocating resources for a second PDSCH during a second frame;
receiving, on the first portion or the second portion of the unlicensed radio frequency spectrum, the second PDSCH during the second frame, wherein the second PDSCH comprises a second PRACH message responsive to the first PRACH message; and
transmitting a third PRACH message.

14. The method of claim 13, wherein:
the communicating with the BS comprises:
receiving the first PDSCH on the first portion of the unlicensed radio frequency spectrum during the first frame, and
transmitting an acknowledgment (ACK) of the first PDSCH on the first portion of the unlicensed radio frequency spectrum during the first frame or subsequent to the first frame.

15. The method of claim 13, wherein:
the grant further indicates that the UE should transmit a physical uplink shared channel (PUSCH) to the BS, and
the communicating with the BS comprises transmitting the PUSCH to the BS on the first portion of the unlicensed radio frequency spectrum during the first frame or during a subsequent frame.

16. The method of claim 13, further comprising:
determining the first portion of the unlicensed radio frequency spectrum based on a frequency hopping pattern of the BS.

17. The method of claim 13, wherein:
the frame format comprises a guaranteed downlink (DL) portion, a guaranteed uplink (UL) portion, and a flexible portion, and the method further comprises:
determining, based on the control channel, that the flexible portion will be for DL transmissions or for UL transmissions.

18. The method of claim 13, further comprising:
determining, based on the control channel, at least one of a sounding reference signal (SRS) resource, a scheduling request resource, a hybrid automatic repetition request (HARQ) acknowledgment (HARQ-ACK) resource, or a channel quality indicator (CQI) reporting resource; and
transmitting at least one of an SRS via the SRS resource, a scheduling request via the SRS resource, a HARQ-ACK via the HARQ-ACK resource, or a CQI report via the CQI reporting resource during the first frame.

19. The method of claim 13, wherein the method further comprises:
determining, based on the first PDCCH, resources for the PRACH message; and
transmitting the first PRACH message on the determined resources during the first frame.

20. The method of claim 13, further comprising:
receiving, on the first portion, the second portion, or a third portion of the unlicensed radio frequency spectrum, a third PDCCH allocating resources for a third PDSCH during a third frame; and
receiving, on the first portion, the second portion, or the third portion of the unlicensed radio frequency spectrum, the third PDSCH during the third frame, wherein the third PDSCH comprises a fourth PRACH message responsive to the third PRACH message.

21. The method of claim 13, further comprising:
detecting at least one reference signal on the first portion of the unlicensed radio frequency spectrum during the first frame; and
processing the at least one reference signal.

22. A method for wireless communications by a user equipment (UE), comprising:
detecting a signature waveform on a first portion of unlicensed radio frequency spectrum for a first period during a first frame;
receiving, on the first portion of the unlicensed radio frequency spectrum and during a second period subsequent to the first period, a control channel indicating:
a frame format of the first frame, or
a grant of the first portion of the unlicensed radio frequency spectrum for the first frame;
communicating with a base station (BS) according to the frame format or the grant during the first frame;
determining, based on an indication received from the BS, a frequency hopping pattern of a cell neighboring the BS;
determining the first portion or a second portion of the unlicensed radio frequency spectrum based on the frequency hopping pattern of the cell neighboring the BS; and
detecting a signature waveform transmitted by the cell neighboring the BS on the determined first portion or second portion of the unlicensed radio frequency spectrum during another frame.

23. An apparatus for wireless communications, comprising:
a processor configured to:
determine, based on a listen before talk (LBT) procedure, that a first portion of unlicensed radio frequency spectrum is available for a frame;
transmit, on the first portion of the unlicensed radio frequency spectrum, a control channel indicating:
a frame format of the first frame, or
a grant of the first portion of the unlicensed radio frequency spectrum for the first frame; and
communicate with a user equipment (UE) according to the frame format or the grant during the first frame; and
a memory coupled with the processor; wherein:
the control channel comprises a first physical downlink control channel (PDCCH) that indicates the grant and the grant indicates the apparatus will transmit a first physical downlink shared channel (PDSCH) to the UE, and the method further comprises:
receiving a first physical random access channel (PRACH) message from the UE during the first frame;
transmitting, on the first portion or a second portion of the unlicensed radio frequency spectrum, a second PDCCH allocating resources for a second PDSCH during a second frame subsequent to the first frame; and
transmitting, on the first portion or the second portion of the unlicensed radio frequency spectrum, the second PDSCH during the second frame, wherein the second PDSCH comprises a second PRACH message responsive to the first PRACH message.

24. An apparatus for wireless communications, comprising:
a processor configured to:
detect a signature waveform on a first portion of unlicensed radio frequency spectrum for a first period during a first frame;
receive, on the first portion of the unlicensed radio frequency spectrum and during a second period subsequent to the first period, a control channel indicating:
a frame format of the first frame, or
a grant of the first portion of the unlicensed radio frequency spectrum for the first frame; and
communicate with a base station (BS) according to the frame format during the first frame; and
a memory coupled with the processor; wherein:
the control channel comprises a first physical downlink control channel (PDCCH) that indicates the grant, the grant indicates the BS will transmit a first physical downlink shared channel (PDSCH) to the apparatus, and the method further comprises:
transmitting a first physical random access channel (PRACH) message during the first frame;
receiving, on the first portion or a second portion of the unlicensed radio frequency spectrum, a second PDCCH allocating resources for a second PDSCH during a second frame;
receiving, on the first portion or the second portion of the unlicensed radio frequency spectrum, the second PDSCH during the second frame, wherein the second PDSCH comprises a second PRACH message responsive to the first PRACH message; and
transmitting a third PRACH message.

25. The apparatus of claim 24, wherein:
the processor is configured to communicate with the BS by:
receiving the first PDSCH on the first portion of the unlicensed radio frequency spectrum during the first frame, and
transmitting an acknowledgment (ACK) of the first PDSCH on the first portion of the unlicensed radio frequency spectrum during the first frame or during a subsequent frame.

26. The apparatus of claim 24, wherein:
the grant further indicates that the apparatus should transmit a physical uplink shared channel (PUSCH) to the BS, and
the processor is configured to communicate with the BS by transmitting the PUSCH to the BS on the first portion of the unlicensed radio frequency spectrum during the first frame or a subsequent frame.

27. The apparatus of claim 24, wherein the processor is further configured to:
determine the first portion of the unlicensed radio frequency spectrum based on a frequency hopping pattern of the BS.

* * * * *